United States Patent [19]

Setzer

[11] Patent Number: 4,503,029

[45] Date of Patent: Mar. 5, 1985

[54] STEAM REFORMING UTILIZING HIGH ACTIVITY CATALYST

[75] Inventor: Herbert J. Setzer, Ellington, Conn.

[73] Assignee: United Technologies Corporation, Hartford, Conn.

[21] Appl. No.: 583,304

[22] Filed: Mar. 1, 1984

Related U.S. Application Data

[60] Continuation of Ser. No. 456,652, Jan. 10, 1983, abandoned, which is a division of Ser. No. 333,841, Dec. 23, 1981, Pat. No. 4,414,140.

[51] Int. Cl.³ ............................................. C01B 1/02
[52] U.S. Cl. ..................................... 423/652; 423/654
[58] Field of Search ...................... 423/652, 653, 654

[56] References Cited

U.S. PATENT DOCUMENTS 3,410,661 11/1982 Taylor ................................. 252/462
3,645,915 2/1972 Stiles ................................. 252/462

Primary Examiner—John Doll
Assistant Examiner—Wayne A. Langel
Attorney, Agent, or Firm—Harry J. Gwinnell

[57] ABSTRACT

High activity, sulfur tolerant steam reforming catalysts are described comprising rhodium or nickel supported on lanthanum stabilized alumina or magnesium promoted lanthanum stabilized alumina. The catalysts have improved activity over conventionally used catalysts in the presence of sulfur containing hydrocarbon fuel (such as No. 2 fuel oil) in a steam reforming environment. The material has particular utility in autothermal, tubular, cyclic and adiabatic steam reforming processes.

7 Claims, 1 Drawing Figure

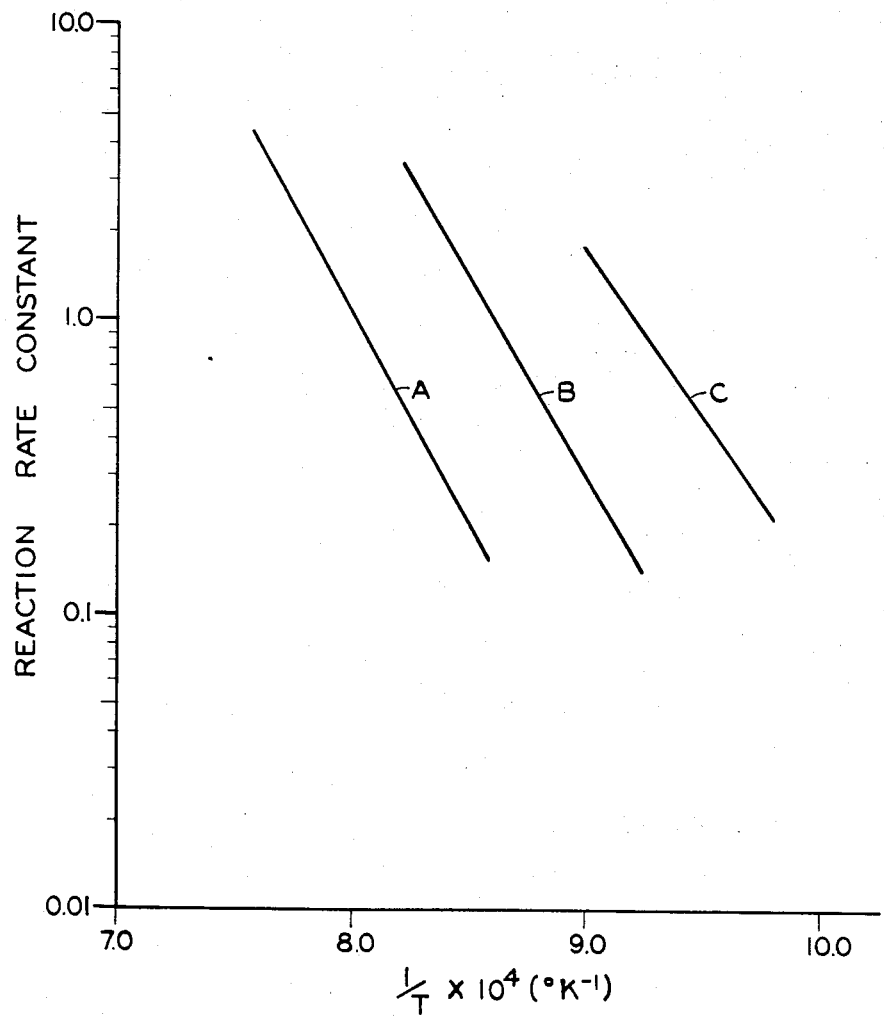

4,503,029

STEAM REFORMING UTILIZING HIGH ACTIVITY CATALYST

This is a continuation of Ser. No. 456,652 filed 1/10/83 now abandoned which is a division of application Ser. No. 333,841 filed on 12/23/81 now U.S. Pat. No. 4,414,140.

TECHNICAL FIELD

The field of art to which this invention pertains is catalytic reforming of gaseous and/or liquid hydrocarbons utilizing the injection of steam.

BACKGROUND ART

In the production of hydrogen, it is well known in the art to treat hydrocarbon material with a catalyst at high temperatures in the presence of steam. Hydrogen, carbon monoxide and carbon dioxide are the products of the reaction. These products are often cooled and passed over a shift conversion catalyst where the carbon monoxide is further reacted with steam to produce additional hydrogen and carbon dioxide.

Generally, the hydrocarbon material which is subjected to such steam reforming processes is first desulfurized. For example, a naphtha is treated with hydrogen in the presence of a hydrodesulfurization catalyst which converts the sulfur in the organic sulfur compounds to hydrogen sulfide. The hydrogen sulfide is then removed from the reformer feedstream by adsorption on zinc oxide. Heavier distillate fuels such as No. 2 fuel oil cannot be adequately desulfurized by hydrodesulfurization and are not considered suitable fuels for steam reforming.

Use of such fuels results in poisoning of the catalyst surface. While steam reforming can still be affected even with the poisoned catalyst, this poisoning does reduce the activity of the catalyst several orders of magnitude. In order to compensate for the reduced activity, steam reformers have been operated at higher temperatures in an attempt to overcome the reduced activity of the catalyst. In addition to requiring greater inputs of energy to maintain the elevated temperatures, the activity of the catalyst is still lower than desired and the use of such elevated temperatures has resulted in rapid decay of the catalyst.

Accordingly, what is needed in this art is a high activity steam reforming catalyst with improved sulfur tolerance.

DISCLOSURE OF INVENTION

The present invention is directed to a high activity catalyst system with improved sulfur tolerance over conventionally used catalysts, especially in a steam reforming environment. The catalyst system according to the present invention comprises a rhodium or nickel catalyst supported on a lanthanum stabilized alumina substrate.

Another aspect of the invention comprises such catalysts supported on a magnesium promoted lanthanum stabilized alumina substrate.

Another aspect of the invention includes an autothermal reforming process utilizing the catalyst system according to the present invention.

Another aspect of this invention includes a tubular steam reforming process utilizing the catalyst system according to the present invention.

The foregoing, and other features and advantages of the present invention, will become more apparent from the following description and accompanying drawing.

BRIEF DESCRIPTION OF THE DRAWING

The FIGURE shows activities of catalysts according to the present invention as compared to conventionally used steam reforming catalysts.

BEST MODE FOR CARRYING OUT THE INVENTION

As the substrate material either a lanthanum stabilized alumina or a magnesium promoted lanthanum stabilized alumina can be used. The lanthanum stabilized alumina substrate is a commercially available catalyst support material available from W. R. Grace & Co. (e.g. Grace SRDX-1/79-1). The magnesium promoted lanthanum stabilized alumina is prepared by impregnating the lanthanum stabilized alumina with a solution (preferably aqueous) of a magnesium salt (preferably magnesium nitrate) followed by drying to remove the solvent, and calcining in air to oxidize the deposited salt to magnesium oxide. Calcining temperatures may vary depending on the particular salt used, but generally temperatures in the range of about 1800° F. (982° C.) are used, e.g. for magnesium nitrate. Enough magnesium salt is deposited on the support material such that after calcining about 3% to about 15% magnesium is present in the support material, and preferably about 5% by weight.

The use of such substrate material is important because of its particular stability at elevated temperatures in a steam reforming environment. Such substrate material has been found to maintain a high B.E.T. (Bruinauer-Emmett-Teller) surface area, the substrate material maintains its dimensional stability (e.g. lack of shrinkage, especially in the preferred pellet form), and has an acceptable crush strength (e.g. when packed into reformer tubes) especially when magnesium promoted. This substrate material has also been found to allow formation of small metal crystallites on its surface which is necessary for catalytic performance according to the present invention. The material also has improved tolerance to carbon formation over, for example, unmodified alumina.

The active catalyst material according to the present invention is deposited on the substrate material by any conventional method in this art, and preferably out of aqueous solution. Metal salts and typically the nitrates are dissolved in either aqueous or organic solvents and dried on the substrate. The deposited salts are then treated with hydrogen to form metal crystallites. Rhodium and nickel metals have been found to be useful to obtain advantages according to the present invention. While mixtures of these materials can be used, such mixtures do not appear to impart any advantages because of the phenomenon of surface enrichment where the less active catalytic material tends to migrate to the surface of the formed composite metal particle. It should be noted that any acceptable route may be used to go from the salt to the metal such as going from the salt form directly to the metal crystallites by hydrogen reduction or oxidation of the salt in air followed by reduction in hydrogen so long as the metal crystallites are formed on the substrate material ultimately. Amounts of rhodium or nickel used may vary over a wide range, but are generally used in amounts based on catalyst plus support material of about 0.01% to about 6% rhodium and about 1% to about 50% nickel and typically in amounts of about 0.1% to about 1% rhodium and about 10% to about 25% nickel.

Types of reformers in which the catalysts according to the present invention would demonstrate the improved sulfur tolerance are tubular reformers, autothermal reformers, adiabatic reformers and cyclic reformers. The primary difference between these reformers is the manner in which heat is supplied for the endothermic reforming reaction. In the tubular reformer the heat is supplied through the walls of a cylinder to the catalyst material. Note commonly assigned U.S. Pat. No. 4,098,589, the disclosure of which is incorporated by reference. In the autothermal reformer the heat is supplied to the catalyst bed directly by the heated gases entering the reformer. Note commonly assigned U.S. Pat. No. 3,976,507, the disclosure of which is incorporated by reference.

In the cyclic reformer, a plurality of reformers are operated simultaneously with one set of reformers operating under a combustion phase (reacting fuel and air) to provide the necessary heat for the hydrogen production phase and the other set of reformers operating under the hydrogen production phase (reacting hydrocarbon and steam), with a switching of phases when the temperature of the reformers in the hydrogen production phase drops below that necessary to sustain hydrogen production. Note commonly assigned U.S. Pat. No. 4,293,315, the disclosure of which is incorporated by reference. In the adiabatic reformer a conventional heat exchanger is utilized to supply the requisite heat to the steam and hydrocarbon prior to passage into the steam reformer.

As stated above, in the autothermal reforming process fuel, steam and preheated air are mixed and passed over the catalyst bed. The air is added to the reactants to raise the temperature of the reactants and supply the endothermic heat for reaction. In order to operate efficiently, the quantity of air added must be kept to a minimum. A representative ratio of oxygen to carbon in the hydrocarbon is 0.35 to 1. This tends to lower reaction temperature and increase the activity requirements for any catalysts used in this environment. At operating temperatures, conventional steam reforming catalysts such as nickel on alpha alumina are deficient in activity and nickel on transition alumina lacks the surface area integrity and stability required for long term use.

While the rhodium and nickel catalysts according to the present invention can be used alone, a particularly attractive arrangement for the autothermal reformer includes the use of an inlet portion of iron oxide or other high temperature carbon tolerant catalyst in such reformer. In this inlet region, all the oxygen reacts with the hydrocarbon and temperatures increase very rapidly. Downstream of this region, the reactor is loaded with the high activity nickel or rhodium catalyst of the present invention. In this latter region, hydrocarbon and reaction intermediates react with steam. Due to the endothermic nature of the reaction with steam, temperatures drop, and it is important to have a high activity catalyst in this region. The use of such a multiple catalyst system allows greater flexibility in the maximum allowable reactor temperature and the method of introducing the air into the reactor.

Although the steam reformers according to the present invention are not limited to a fuel cell application, when used for this purpose sulfur containing fuels ranging from sulfur containing natural gas to heavier sulfur containing fuel such as No. 2 fuel oil have been successfully used with the present invention. Synthetic fuels such as gasified coal and coal derived liquids are also suitable for use with the present invention. Hydrocarbons derived from sources other than petroleum such as coal and shale oil are similarly suitable for use with the present invention as long as the properties of such fuel are at least equal to that of natural gas or mixtures of natural gas and No. 2 fuel oil.

EXAMPLE 1

A lanthanum stabilized alumina catalyst support material was purchased from W. R. Grace & Co. in pellet form having dimensions of about 0.125 in. (0.318 cm) diameter and about 0.125 in. (0.318 cm) length. A batch of these pellets were immersed in an aqueous solution of $Mg(NO_3)_2 \cdot 6H_2O$ having a concentration of 0.58 grams of magnesium compound per milliliter of solution. After immersion for approximately 5 minutes with ultrasonic vibration and 30 minutes without, the pellets were removed from the solution. The pellets were then oven dried in air for 4 hours at about 270° F. (132° C.) and calcined at 1897° F. (1036° C.) for 16 hours and cooled. The magnesium promoted lanthanum stabilized alumina pellets were then immersed in an aqueous solution of $Rh(NO_3)_3$ having a concentration of 0.031 grams or rhodium compound per milliliter of solution. After immersion for approximately 5 minutes under ultrasonic vibration and 30 minutes without vibration, the pellets wre removed from the solution and dried in air for 3.5 hours at 230° F. (110° C.), followed by heating in a hydrogen atmosphere to form the metal crystallites on the substrate material.

The hydrogen reduction step was performed as follows: the above-treated pellets were placed on a tray in an oven which was alternatively evacuated and filled with nitrogen three times. The oven temperature was raised to approximately 600° F. (316° C.) and the atmosphere over the pellets changed according to the following schedule:

| % $N_2$ | % $H_2$ | Time in Hours |
|---|---|---|
| 100 | 0 | 0.25 |
| 95 | 5 | 0.25 |
| 90 | 10 | 0.25 |
| 75 | 25 | 0.50 |
| 0 | 100 | 2.00 |

After cooling to 200° F. (93° C.), the atmosphere over the pellets is changed to 100% $N_2$. The pellets are then cooled to room temperature and the atmosphere over the pellets adjusted as follows:

| % $N_2$ | % $O_2$ | Time in Hours |
|---|---|---|
| 95 | 5 | 0.5 |
| 90 | 10 | 0.5 |
| 80 | 20 | 0.5 |

After 30 hours of use in a tubular steam reformer using methane gas containing approximately 2250 parts per million by weight sulfur (as $H_2S$), the rhodium particles on the pellets were found to be 1.5 to 3 nanometers in diameter.

EXAMPLE 2

The following reactants were steam reformed in an isothermal tubular steam reformer. Although only a microreformer was employed (0.375 inch (0.953 cm) inner diameter containing 1 inch (2.54 cm) length, 0.5 grams of catalyst material), the ratios used apply to any size reformer.

| Tubular Reformer (Isothermal) | |
|---|---|
| Reactants | |
| CH$_4$ space velocity | 2.25 (lbs/hr)/lb. catalyst |
| H$_2$O/CH$_4$ ratio | 4.0 |
| H$_2$/CH$_4$ ratio | 0.27 |
| H$_2$S concentration | 2,225 parts per million by weight |
| Pressure - 1 atmosphere | |

| Nickel catalyst - 25 wt. % nickel on lanthanum stabilized alumina. Size 35–60 mesh. | | | | |
|---|---|---|---|---|
| Temperature, °F. | 1496 | 1567 | 1643 | 1715 |
| % Conversion of hydrocarbon to oxides of carbon | 007.2 | 016.1 | 039.4 | 076.0 |
| Reaction rate constant (k) | 0.165 | 0.384 | 1.10 | 3.13 |

| Rhodium catalyst - 1 wt. % rhodium on lanthanum stabilized alumina. Size 35–60 mesh. | | | | | |
|---|---|---|---|---|---|
| Temperature, °F. | 1396 | 1424 | 1459 | 1493 | 1521 |
| % Conversion of hydrocarbon to oxides of carbon | 012.2 | 016.4 | 025.1 | 035.9 | 050.8 |
| Reaction rate constant (k) | 0.29 | 0.391 | 0.632 | 0.972 | 1.55 |

The reaction rate constant (k) (synonymous with activity) is defined by the pseudo-first order rate equation:

$$k = (\text{space velocity}) \times \ln\left(\frac{1}{1 - \frac{\% \text{ conversion}}{100}}\right)$$

In the FIGURE, the data for both catalysts (nickel-B and rhodium-C) is shown on a conventional Arrhenius Graph. In this graph, the reaction rate constant (k) is plotted against the reciprocal of the absolute test temperatures. For comparative purposes, a plot of conventional 15% nickel catalyst on alpha alumina is shown (A).

When in the above testing the hydrocarbon gas was switched from methane to ethane reaction rate constants increased by a factor of 20 to 30, demonstrating that there are fuels even easier than methane to reform. Similarly, a switch in sulfur contamination from hydrogen sulfide to such things as dimethyl sulfide, t-butyl mercaptan and tetrahydrothiophene show substantially no change in catalyst performance based on particular sulfur contamination (±10%). Changes in catalyst loading (e.g. rhodium) on the substrate material from 0.1% to 6% by weight have shown linear increase in rate constant with increase in loading up to about ;b 1% to 1.5% by weight, at which point the curve flattens out. The rhodium catalyst using the magnesium promoted lanthanum stabilized alumina support is 15–20% less active than the rhodium catalyst using the lanthanum stabilized alumina, but retains its crush strength at higher temperatures than the lanthanum stabilized alumina with the magnesium.

To further demonstrate the improved activity of the atalysts of the present invention, the following test was run. Natural gas containing 5 parts per million by weight sulfur was flowed at a rate of 0.6 lb. fuel/hr/lb. catalyst at 1 atmosphere of pressure through a tubular reformer with an inlet temperature of 900° F. (482° C.) and an outlet temperature of 1390° F. (754° C.) containing 1% by weight rhodium on lanthanum stabilized alumina (0.125 in., 0.318 cm. diameter × 0.125 in., 0.318 cm. length pellets) catalyst. The H$_2$O/C ratio was 3.0 and H$_2$/C ratio was 0.4. More than 97.5% by weight of the hydrocarbon was found to have been converting.

As stated, the catalytic material according to the present invention provides high activity in a steam reforming environment with improved sulfur tolerance. These catalyst also allow reactors to be operated at lower temperatures at greater efficiencies allowing less expensive construction materials to be used. This provides particular advantages for adiabatic, autothermal and tubular steam reforming. And, of course, while these catalysts have been described for use in steam reforming processes utilizing sulfur containing fuels, they could be used in conventional sulfur-free reforming as well.

Although this invention has been shown and described with respect to detailed embodiments thereof, it will be understood by those skilled in the art that various changes in form and detail thereof may be made without departing from the spirit and scope of the claimed invention.

I claim:

1. In a steam reforming process for converting hydrocarbon material to hydrogen gas in the presence of sulfur comprising adding steam to the hydrocarbon material and passing the steam and hydrocarbon material over catalyst material at elevated temperatures, wherein the improvement comprises utilizing as a catalyst material high activity, sulfur tolerant catalyst of rhodium supported on lanthanum stabilized alumina or magnesium promoted lanthanum stabilized alumina.

2. In a steam reforming process for converting hydrocarbon material to hydrogen gas in the presence of sulfur comprising adding steam to the hydrocarbon material and passing the steam and hydrocarbon material over catalyst material at elevated temperatures, wherein the improvement comprises utilizing as a catalyst material high activity, sulfur tolerant catalysts consisting essentially of nickel supported on magnesium promoted lanthanum stabilized alumina.

3. The process of claim 1 or 2 wherein the reactant mixture is brought to the requisite elevated temperature by transfer of heat through the metal walls of a reactor containing the catalyst material.

4. The process of claim 1 or 2 wherein the reactant mixture is brought to the requisite elevated temperature by preheating air and adding it to the reactant mixture prior to contact with the catalyst material.

5. The process of claim 1 or 2 wherein the reactant mixture is brought to the requisite elevated temperature by preheating in a heat exchanger prior to contact with the catalyst material.

6. The process of claim 1 or 2 wherein the catalyst material is brought to the requisite elevated temperature by contacting the catalyst material with combusted gases followed by contact with the reactant mixture in a sequential operation.

7. The process of claim 1 or 2 wherein the hydrocarbon material is No. 2 fuel oil.

* * * * *